(12) United States Patent
Cedergren et al.

(10) Patent No.: US 9,693,273 B2
(45) Date of Patent: Jun. 27, 2017

(54) TRIGGERING PILOT TRANSMISSION FOR MOBILITY MEASUREMENTS

(71) Applicant: Telefonaktiebolaget L M Ericsson (publ), Stockholm (SE)

(72) Inventors: Andreas Cedergren, Bjarred (SE); Andres Reial, Malmo (SE); Claes Tidestav, Balsta (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 13 days.

(21) Appl. No.: 14/769,799

(22) PCT Filed: Sep. 23, 2014

(86) PCT No.: PCT/EP2014/070188
§ 371 (c)(1),
(2) Date: Aug. 21, 2015

(87) PCT Pub. No.: WO2016/045695
PCT Pub. Date: Mar. 31, 2016

(65) Prior Publication Data
US 2016/0255548 A1 Sep. 1, 2016

(51) Int. Cl.
*H04W 36/00* (2009.01)
*H04L 5/00* (2006.01)
(Continued)

(52) U.S. Cl.
CPC ....... *H04W 36/0088* (2013.01); *H04L 5/0048* (2013.01); *H04W 36/0094* (2013.01);
(Continued)

(58) Field of Classification Search
None
See application file for complete search history.

(56) References Cited

U.S. PATENT DOCUMENTS

| 2005/0037799 A1* | 2/2005 | Braun | H04W 16/28 455/525 |
| 2009/0111469 A1* | 4/2009 | Lee | H04W 36/32 455/436 |

(Continued)

FOREIGN PATENT DOCUMENTS

| EP | 1545149 A2 | 6/2005 |
| EP | 1835774 A1 | 9/2007 |

(Continued)

OTHER PUBLICATIONS

Jihoon Lee et al., Dynamic Beamforming Handover Mechanism Using Neighbor Profile in IEEE 802.11 Wireless LANs, International Journal of Advancements in Computing Technology, vol. 5, No. 11, Jul. 2013, pp. 40-47.

(Continued)

*Primary Examiner* — Brian Roberts
(74) *Attorney, Agent, or Firm* — Leffler Intellectual Property Law, PLLC (57) ABSTRACT

There is provided a method for triggering mobility measurements for a wireless device. The method is performed by a radio access network node (RANN). The RANN is configurable to transmit using a set of transmission beams. The method comprises receiving signalling from a wireless device (WD). The user traffic signalling is indicative of a current position of the WD and a performance quality metric of the WD. The method comprises, only in a case the performance quality metric fulfills a location dependent performance quality criterion, activating transmission of mobility pilot signals to the WD in at least one transmission beam in the set of transmission beams. The method comprises, thereafter, instructing the WD to perform measurements on the at least one transmission beam.

23 Claims, 3 Drawing Sheets (51) Int. Cl.
  *H04W 36/30* (2009.01)
  *H04W 64/00* (2009.01)
  *H04W 36/06* (2009.01)

(52) U.S. Cl.
  CPC ........... *H04W 36/30* (2013.01); *H04W 64/00* (2013.01); *H04W 36/0072* (2013.01); *H04W 36/06* (2013.01)

(56) References Cited

U.S. PATENT DOCUMENTS

| | | | | |
|---|---|---|---|---|
| 2010/0127931 | A1* | 5/2010 | Rensburg | H01Q 3/04 342/372 |
| 2010/0303034 | A1* | 12/2010 | Chen | H04L 5/0023 370/329 |
| 2011/0134871 | A1* | 6/2011 | Nogami | H04L 5/0044 370/329 |
| 2014/0036809 | A1* | 2/2014 | Xu | H04W 52/54 370/329 |
| 2014/0146788 | A1 | 5/2014 | Wallentin et al. | |

FOREIGN PATENT DOCUMENTS

| | | |
|---|---|---|
| WO | 200800134219 A1 | 11/2008 |
| WO | 20130028128 A1 | 2/2013 |

OTHER PUBLICATIONS

Alcatel, 3GPP TSG RAN WG1 #36, R1-040195, Fast Beam Selection in Soft Handover, Malaga, Spain, Feb. 16-20, 2004, pp. 1-4.
PCT International Search Report, mailed Jun. 17, 2015, in connection with International Application No. PCT/EP2014/070188, all pages.
PCT Written Opinion, mailed Jun. 17, 2015, in connection with International Application No. PCT/EP2014/070188, all pages.

* cited by examiner

TRIGGERING PILOT TRANSMISSION FOR MOBILITY MEASUREMENTS

TECHNICAL FIELD

Embodiments presented herein relate to triggering of mobility measurements, and particularly to a method, a radio access network node, a computer program, and a computer program product for triggering mobility measurements for a wireless device.

BACKGROUND

In communications networks, there may be a challenge to obtain good performance and capacity for a given communications protocol, its parameters and the physical environment in which the communications network is deployed.

For example, handover is a vital part of any cellular communications network. A handover may be defined as the process of transferring an ongoing connection of a wireless device from one radio access network node (denoted the serving radio access network node) to another radio access network node (denoted the target radio access network node) in order to accomplish a transparent service over a large coverage area. The handover should be performed without any loss of data transmission to/from the wireless device and with as small interrupt as possible for the wireless device.

To enable a handover, it is necessary to find a suitable target cell as served by the target radio access network node, and to ensure that it is possible to sustain reliable communication to/from the wireless device in the target cell. Candidates for suitable target radio access network nodes (and/or target cells) are usually stored in so-called neighbor lists, which are stored at least at the serving radio access network node. To make sure that it is possible to sustain reliable communication to/from the wireless device in the target cell, the connection quality in the target cell needs to be estimated before the handover can be performed.

The connection quality of the target cell is commonly estimated by measurements related to the wireless device. Downlink (DL, i.e., transmission from radio access network node to wireless device) and/or uplink (UL, i.e., transmission to radio access network node from wireless device) measurements may be considered. Relying solely on uplink measurements may be unreliable, since the uplink connection quality can be different from the corresponding downlink connection quality. Therefore, handovers in cellular communications networks are commonly based on downlink measurements.

In existing cellular communications networks, all radio access network nodes (RANNs) continuously transmit pilot signals that wireless devices (WDs) in neighbor cells use to estimate the target cell quality. This is true in the Global System for Mobile Communications (GSM) where such pilot signals are transmitted on the broadcast control channel (BCCH), in the Universal Mobile Telecommunications System (UMTS) where such pilot signals are transmitted on the Common Pilot Channel (CPICH) and in the Long Term Evolution (LTE) telecommunications system where such pilot signals are transmitted as cell specific reference signals, as well as in WiFi where such pilot signals are transmitted as beacons. This makes it possible to estimate the quality of neighbor cells with relatively good accuracy. The WDs perform measurements periodically and report the measurements to the network (i.e., the RANN). If it is detected that the serving cell quality is getting near the candidate cell power, a more detailed measurement process or a handover procedure may be initiated.

Future cellular communications networks may use advanced antenna systems to a large extent. With such antennas, signals will be transmitted in narrow transmission beams to increase signal strength in some directions, and/or to reduce interference in other directions. When the antenna is used to increase coverage, handover between narrow transmission beams in neighboring RANNs may become a necessity. The serving RANN also needs to decide if a beam switch or beam update is necessary within the own cell. The transmission beam through which the RANN is currently communicating with the WD is called the serving beam and the transmission beam it will hand over to, or switch to, is called the target beam. The serving beam and the target beam may be transmission beams of the same or different RANN.

Applying the principle of continuous transmission of pilot signals in all individual transmission beams in such a future cellular communications network may be convenient for WD measurements, but it may degrade the performance of the network. For example, continuous transmission of pilot signals in all individual transmission beams may generate a lot of interference in neighbor cells, it may consume network capacity otherwise available for data, and may lead to higher power consumption of the RANNs, since long discontinuous transmission (DTX) periods become impossible.

Further, in a communications network relying on advanced antennas with narrow transmission beams to improve coverage, it is inefficient, or sometimes even impossible, to transmit the pilot signal in all transmission beams at the same time. The natural alternative to transmit consecutively in different beams leads to longer measurement periods, slower handovers and beam updates.

Hence, there is a need for an improved triggering of mobility measurements for wireless devices.

SUMMARY

An object of embodiments herein is to provide efficient triggering of mobility measurements.

The inventors of the enclosed embodiments have realized that in order to enable efficient handover or beam switching procedures, the network should avoid handover procedures that rely on continuous pilot signals. The inventors of the enclosed embodiments have thus identified a need for a measurement procedure that includes dynamically activated measurement signals and robust criteria for activating such signals and initiating the WD measurement process.

A particular object is therefore to provide efficient triggering of mobility measurements which avoids continuous transmission of downlink pilot signals.

According to a first aspect there is presented a method for triggering mobility measurements for a wireless device. The method is performed by a radio access network node (RANN). The RANN is configurable to transmit using a set of transmission beams. The method comprises receiving signalling from a wireless device (WD). The user traffic signalling is indicative of a current position of the WD and a performance quality metric of the WD. The method comprises, only in a case the performance quality metric fulfils a location dependent performance quality criterion, activating transmission of mobility pilot signals to the WD in at least one transmission beam in the set of transmission beams. The method comprises, thereafter, instructing the WD to perform measurements on the at least one transmission beam.

Advantageously this provides efficient triggering of mobility measurements.

Advantageously this enables continuous transmission of downlink pilot signals to be avoided.

Advantageously this enables satisfactory handover and beam switching performance to be maintained and guaranteed.

Advantageously this enables mobility pilot signals only to be transmitted when needed.

Advantageously this improves network capacity, energy efficiency, and link performance for individual wireless devices.

According to a second aspect there is presented a RANN for triggering mobility measurements for a WD. The RANN is configurable to transmit using a set of transmission beams. The RANN comprises a processing unit. The processing unit is configured to receive signalling from a WD. The user traffic signalling is indicative of a current position of the WD and a performance quality metric of the WD. The processing unit is configured to, only in a case the performance quality metric fulfils a location dependent performance quality criterion, activate transmission of mobility pilot signals to the WD in at least one transmission beam in the set of transmission beams. The processing unit is configured to, thereafter, instruct the WD to perform measurements on the at least one transmission beam.

According to a third aspect there is presented a computer program for triggering mobility measurements for a wireless device. The computer program comprises computer program code which, when run on a processing unit of a RANN configurable to transmit using a set of transmission beams, causes the processing unit to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
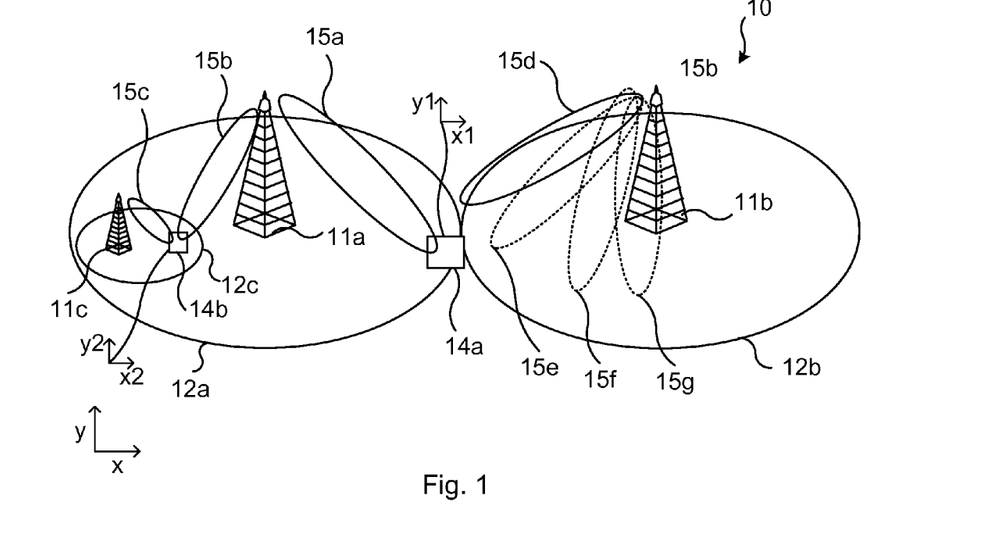
FIG. 1 is a schematic diagram illustrating a communication network according to embodiments.

FIG. 1 is a schematic diagram illustrating a communications network 10 where embodiments presented herein can be applied. The communications network 10 comprises radio access network nodes, RANNs 11a, 11b 11c. The RANNs may be any combination of radio base stations such as base transceiver stations, node Bs, and/or evolved node Bs. The RANNs may further be any combination of macro RANNs 11a, 11b, and micro, or pico, RANNs 11c. Each RANN 11a, 11b, 11c provides network coverage in a respective coverage region 12a, 12b, 12C by transmitting transmission beams 15a, 15b, 15c, 15d, 15f, 15g in that coverage region 12a, 12b, 12C. Each RANN 11a, 11b 11c is assumed to be operatively connected to a core network (not illustrated). The core network may in turn be operatively connected to a service and data providing wide area network.

Hence, a wireless device 14a, 14b served by one of the RANNs 11a, 11b, 11b may thereby access services and data as provided by the wide area network. The wireless devices 14a, 14b may be any combination of mobile stations, mobile phones, handsets, wireless local loop phones, user equipment (UE), smartphones, laptop computers, and/or tablet computers. Each wireless device 14a, 14b is assumed to be located at current position [x1, y1], [x2, y2] according to some coordinate system [x, y]. Further, although only two coordinates x and y are schematically illustrated in FIG. 1, the current position may have three coordinates ([x1, y1, z1] for wireless device 14a and [x2, y2, z2] for wireless device 14b) in a three-dimensional coordinate system [x, y, z].

A wireless device 14a, 14b may move from position to position and thus from coverage region to 12a, 12b, 12C, thus requiring handover of the wireless device 14a, 14b from one RANN to another RANN, or at least from one transmission beam to another transmission beam. As noted above, such handover should be performed without any loss of data transmission to/from the wireless device and with as small interrupt as possible for the wireless device. The serving beam and the target beam may be transmission beams of the same or different RANN. Hence, the term handover as herein used should be interpreted as a handover from a source beam to a target beam.

The herein disclosed embodiments relate to triggering mobility measurements for a given WD 14a, 14b based on primarily the quality of the current downlink data channel to the WD 14a, 14b and the current position of the WD 14a, 14b. Mobility pilot signals may be activated in a candidate beam set including the serving and/or possible target beam(s) and the WD 14a, 14b may be instructed to perform measurements on the pilot signals. The results of the measurements may then be reported to the RANN 11a, 11b, 11c and appropriate beam switching or cell handover operations may be performed. Also uplink measurements may be considered in the decision to activate downlink mobility pilot signals to further reduce the network load due to transmitted pilot signals. The embodiments disclosed herein particularly relate to triggering mobility measurements for a wireless device 14a, 14b. In order to obtain such triggering there is provided a RANN 11a, 11b, 11c, methods performed by the RANN 11a, 11b, 11c, a computer program comprising code, for example in the form of a computer program product, that when run on a processing unit of the RANN 11a, 11b, 11c, causes the processing unit to perform the methods.

Figure 2A:
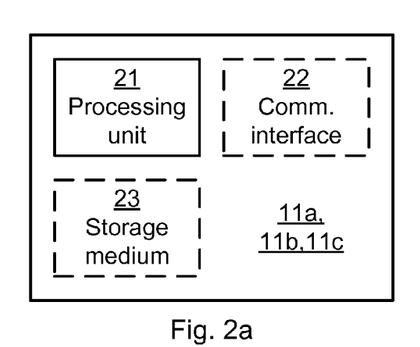
FIG. 2a is a schematic diagram showing functional units of a radio access network node according to an embodiment.

FIG. 2a schematically illustrates, in terms of a number of functional units, the components of a RANN 11a, 11b, 11c according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31a (as in FIG. 3), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The RANN 11a, 11b, 11c may further comprise a communications interface 22 for communications with another RANN 11a, 11b, 11c, a core network, and/or at least one wireless device 14a, 14b. As such the communications interface 22 may comprise one or more transmitters and receivers, comprising analogue and digital components and a suitable number of antennas for radio communications and a suitable number of wired ports for wired communications. The processing unit 21 controls the general operation of the RANN 11a, 11b, 11c e.g. by sending data and control signals to the communications interface 22 and the storage medium 23, by receiving data and reports from the communications interface 22, and by retrieving data and instructions from the storage medium 23. Other components, as well as the related functionality, of the RANN 11a, 11b, 11c are omitted in order not to obscure the concepts presented herein.

Figure 2B:
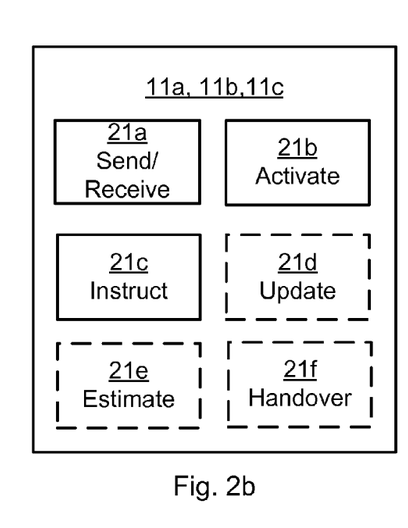
FIG. 2b is a schematic diagram showing functional modules of a radio access network node according to an embodiment.

FIG. 2b schematically illustrates, in terms of a number of functional modules, the components of a RANN 11a, 11b, 11c according to an embodiment. The RANN 11a, 11b, 11c of FIG. 2b comprises a number of functional modules; a send and/or receive module 21a configured to perform any of below disclosed steps S102, S102a, S108a, S108b, an activate module 21b configured to perform any of below disclosed steps S104, S104a, and an instruct module 21c configured to perform any of below disclosed steps S106, S106a. The RANN 11a, 11b, 11c of FIG. 2b may further comprises a number of optional functional modules, such as any of an update module 21d configured to perform any of below disclosed steps S110a, S110b, S110c, an estimate module 21e configured to perform below disclosed step S108c, and a handover module 21f configured to perform below disclosed step S112. The functionality of each functional module 21a-f will be further disclosed below in the context of which the functional modules 21a-f may be used.

In general terms, each functional module 21a-f may be implemented in hardware or in software. Preferably, one or more or all functional modules 21a-f may be implemented by the processing unit 21, possibly in cooperation with functional units 22 and/or 23. The processing unit 21 may thus be arranged to from the storage medium 23 fetch instructions as provided by a functional module 21a-f and to execute these instructions, thereby performing any steps as will be disclosed hereinafter.

Figures 3, 4, 5:
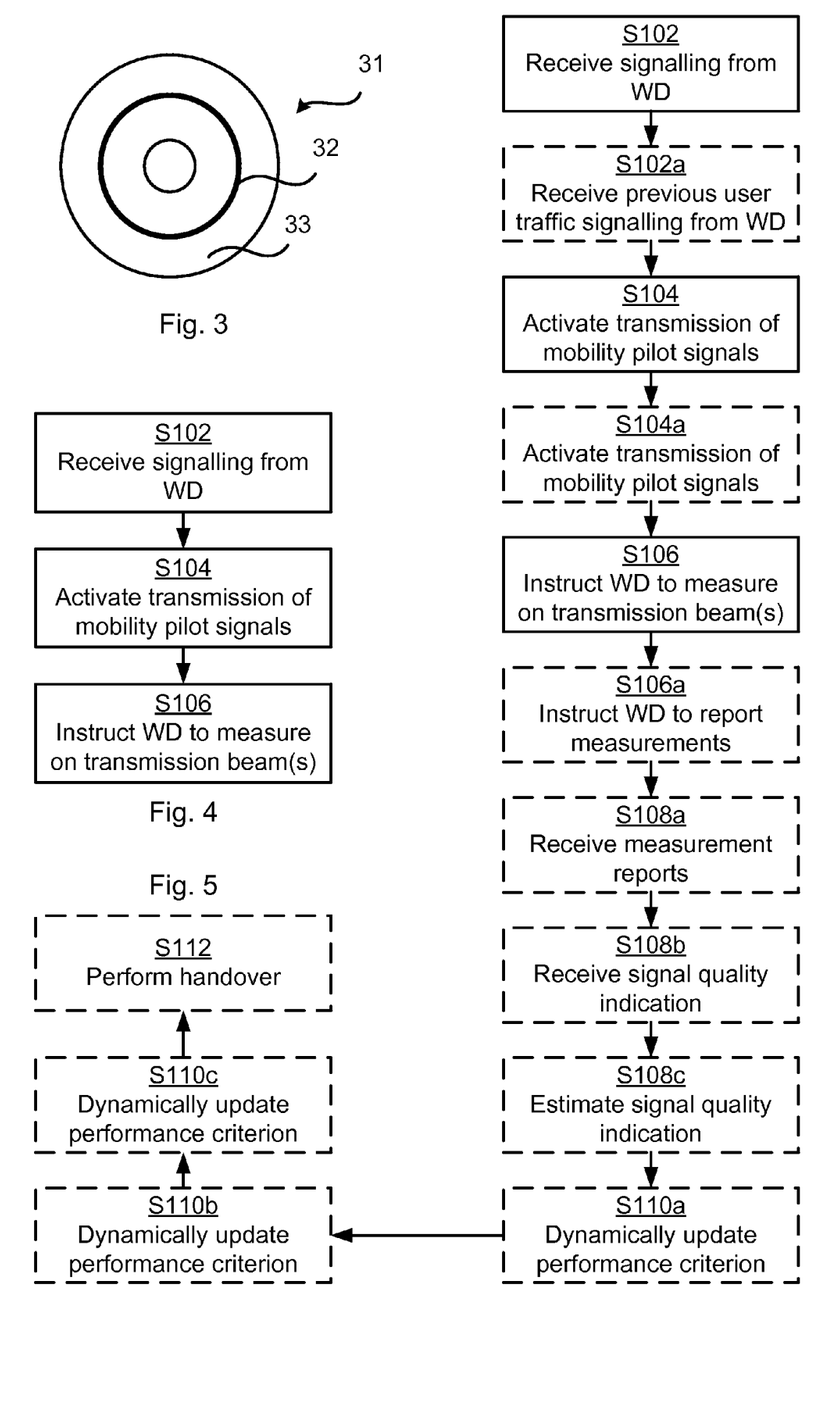
FIG. 3 shows one example of a computer program product comprising computer readable means according to an embodiment.
FIGS. 4, 5, and 6 are flowcharts of methods according to embodiments.

FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 32 is here schematically shown as a track on the depicted optical disk, the computer program 32 can be stored in any way which is suitable for the computer program product 31.

Figure 6:
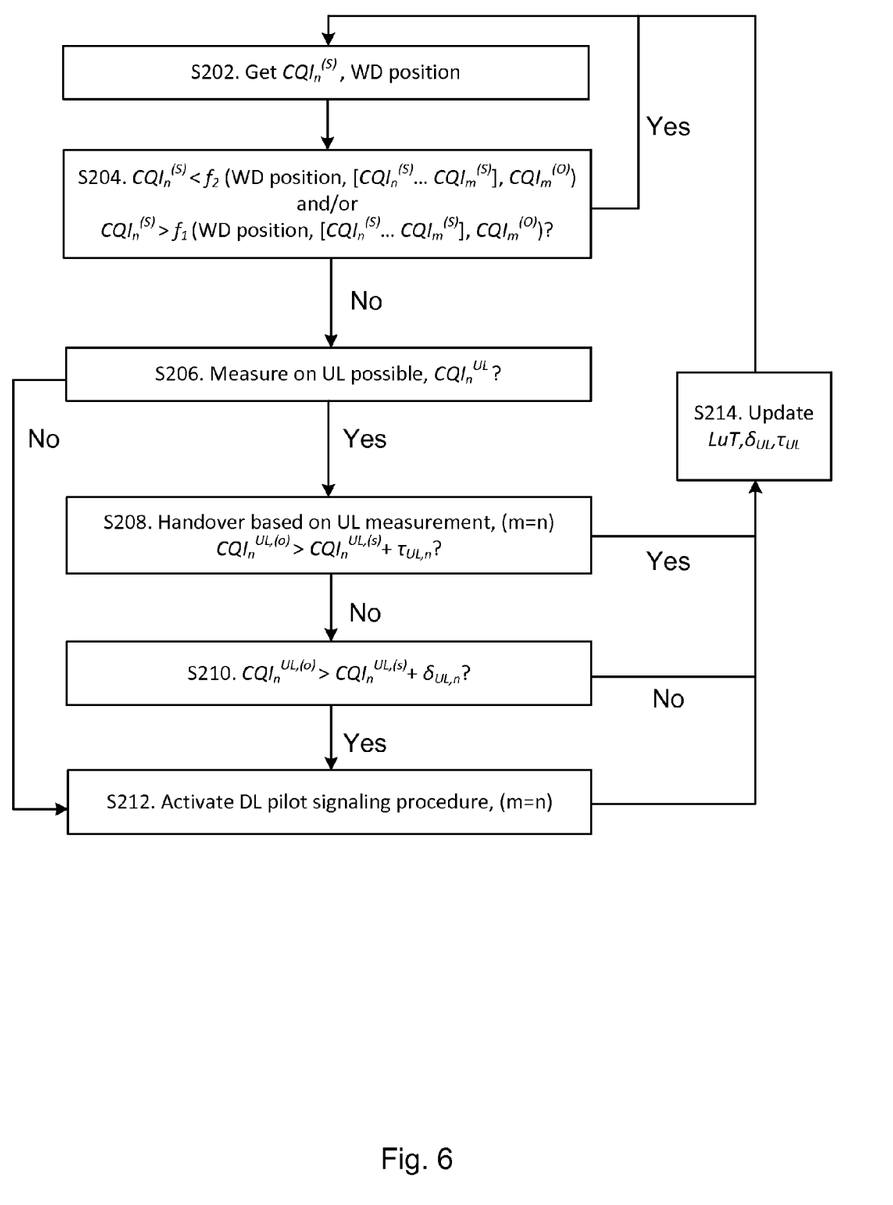

FIGS. 4, 5, and 6 are flow chart illustrating embodiments of methods for triggering mobility measurements for a wireless device 14a, 14b. The methods are performed by the RANN 11a, 11b, 11c. The methods are advantageously provided as computer programs 32.

Reference is now made to FIG. 4 illustrating a method for triggering mobility measurements for a wireless device 14a, 14b as performed by the RANN 11a, 11b, 11c according to an embodiment. The RANN 11a, 11b, 11c is configurable to transmit using a set of transmission beams 15a, 15b, 15c, 15d, 15e, 15f, 15g. According to the illustrative example of FIG. 1 the RANN 11a is configurable to transmit using transmission beams 15a and 15b, the RANN 11c is configurable to transmit using transmission beam 15c; and the RANN 11b is configurable to transmit using transmission beams 15d, 15e, 15f, 15g.

The RANN 11a, 11b, 11c is configured to, in a step S102, receive signalling from a WD 14a, 14b. The user traffic signalling is indicative of a current position [x1, y1], [x2, y2] of the WD 14a, 14b. In this respect, the WD 14a, 14b does not need to send its location, or current position, explicitly; it is only assumed that its transmitted signals can be used by the RANN 11a, 11b, 11c to determine the location of the WD 14a, 14b. However, the WD 14a, 14b may send its location, or current position, explicitly, e.g., by means of Global Positioning System (GPS) coordinates.

Further, by means of indicating the current position the RANN 11a, 11b, 11c is made aware of not only the distance to the WD 14a, 14b but also the angle to the WD 14a, 14b. The user traffic signalling is also indicative of a performance quality metric of the WD 14a, 14b. Examples of the performance quality metric of the WD 14a, 14b will be provided below. The received signalling from the WD 14a, 14b may thus include the position of the WD 14a and a channel quality index, $CQI_n^{(s)}$, for the current beam or beams, where the index s indicates serving beam and the index n indicates the time.

The received signalling from the WD 14a, 14b is by the RANN 11a, 11b, 11c used as a trigger for the RANN 11a, 11b, 11c to activate transmission of mobility pilot signals. The RANN 11a, 11b, 11c is thus configured to, in a step S104, activate transmission of mobility pilot signals to the WD 14a, 14b in at least one transmission beam in the set of transmission beams 15a, 15b, 15c, 15d, 15e, 15f, 15g. Step S104 is only performed in a case the performance quality metric fulfils a location dependent performance quality criterion.

The RANN 11a, 11b, 11c is configured to, in a step S106, instruct the WD 14a, 14b to perform measurements on the at least one transmission beam having been activated in step S104.

The activation of the transmission of mobility pilot signals may thus comprise turning on relevant mobility pilot signals and instructing the WD 14a to perform measurements. If downlink measurement is triggered for several WDs 14a, 14b that share the same candidate list, they could be triggered to perform measurements on the same mobility pilot symbols at the same time. The WD 14a could also be triggered to measure on the downlink pilot signals sent to other WDs 14a, 14b.

Embodiments relating to further details of triggering mobility measurements for a wireless device 14a, 14b as performed by the RANN 11a, 11b, 1c will now be disclosed.

There may be different ways for the current position of the WD 14a, 14b to be provided. For example, the current position may be provided as positional coordinates of the WD 14a, 14b. The positional coordinates may be positional coordinates in a Cartesian coordinate system. The position of the WD 14a, 14b may be estimated from uplink and/or downlink measurements, using the currently used radio access technology or other radio access technologies. The current transmission beam may also be used to indicate the position of the WD 14a. The RANN 11a may additionally or alternatively acquire a Doppler estimate for the WD 14a.

Reference is now made to FIG. 5 illustrating methods for triggering mobility measurements for a wireless device 14a, 14b as performed by the RANN 11a, 11b, 11c according to further embodiments.

There may be different ways to determine the location dependent performance quality criterion. Different embodiments relating thereto will now be described in turn.

For example, the location dependent performance quality criterion may depend on the maximum available transmission power of the RANN towards the WD. Hence, the location dependent performance quality criterion may depend on the distance between the RANN 11a, 11b, 11c and the WD 14a 14b. Additionally or alternatively, the location dependent performance quality criterion may depend on the angular position of the WD with respect to the RANN. Further additionally or alternatively, the location dependent performance quality criterion may depend on the type of RANN, such as if the RANN is a macro RANN (such as RANN 11a, 11b) or a micro or pico RANN (such as RANN 11c). A WD 14a, 14b with more antennas than another WD 14a, 14b may allow a lower transmission power to be used by the RANN 11a, 11b, 11c. Thus, yet additionally or alternatively, the location dependent performance quality criterion may depend on the number of antennas at the WD 14a, 14b.

For example the location dependent performance quality criterion may be based on previous user traffic signalling. The previous user traffic signalling may be associated with a previous location of the WD 14a, 14b. That is, the location dependent performance quality criterion may be based on past or historical values. Particularly, the RANN 11a, 11b, 11c may be configured to, in an optional step S102a, receive previous user traffic signalling indicative of at least one previous position of the WD 14a, 14b and at least one previous performance quality metric of the WD. The information received in step S102a may have, at the time of its reception, been received by the RANN 11a, 11b and stored in the storage medium 23. Hence, the receiving in step S102a may be interpreted as receiving information from the storage medium 23. The location dependent performance quality criterion may then depend on also the at least one previous position of the WD 14a, 14b and the at least one previous performance quality metric of the WD 14a, 14b.

There may be different ways for the transmission beam in the set of transmission beams to be associated with each other. Different embodiments relating thereto will now be described in turn.

For example, each transmission beam in the set of transmission beams may corresponds to an individual cell, sector, wireless node (such as RANN), or access point.

For example, the signalling from the WD 14a, 14b may by the RANN 11a, 11b, 11c be received on a serving transmission beam in the set of transmission beams. The RANN 11a, 11b, 11c may then be configured to, in an optional step S104a, activate transmission of the mobility pilot signals by activating transmission of mobility pilot signals to the WD 14a, 14b in at least one target transmission beam in the set of transmission beams. The at least one target transmission beam may be different from the serving transmission beam.

There may be different ways to determine the at least one target transmission beam. For example, as disclosed above the signalling received in step S102 is indicative of a current position [x1, y1], [x2, y2] of the WD 14a, 14b and a performance quality metric of the WD 14a, 14b. At least some of this information may be considered when determining the at least one target transmission beam. Particularly, the at least one target transmission beam may be determined based on the current position [x1, y1], [x2, y2] of the WD 14a, 14b.

There may be information that maps positions to transmission beams. Hence, the at least one target transmission beam may further be determined based on information mapping WD positions to transmission beams in the set of transmission beams. That is, according to the information that maps positions to transmission beams each position of the WD 14a, 14b may identify at least one transmission beam. Further, the information mapping WD positions to transmission beams in the set of transmission beams may be determined based on a self-adjusting algorithm that maps the WD position to candidate transmission beams. The self-adjusting algorithm may involve updating the information that maps WD positions to sets of transmission beams based on the identity of the target transmission beam and on the information indicating the current position of the WD 14a, 14b. The self-adjusting algorithm may be implemented as a look up table (LuT) comprising beam activation information. Entries in the LuT may be updated based on the identity of the target transmission beam and on the information indicating the current position of the WD 14a, 14b. Such a LuT may thus comprise positional data and data identifying transmission beams, and where the mapping between the positional data and the data identifying transmission beams is updated based on the identity of the target transmission beam and on the information indicating the current position of the WD 14a, 14b.

The position of the WD 14a, 14b may further be combined with the performance quality metric of the WD 14a, 14b. Thus, the at least one target transmission beam may further be determined based on the performance quality metric of the WD 14a, 14b. This could enable mobility pilot signals to be transmitted only when they are required and only in a relevant subset of the transmission beams.

There may be different actions for the RANN 11a, 11b, 11c to instruct the WD 14a, 14b to perform after the RANN 11a, 11b, 11c has activated transmission of the mobility pilot signals.

For example, the RANN 11a, 11b, 11c may instruct the WD 14a, 14b to report performed measurements on the mobility pilot signals back to the RANN 11a, 11b, 11c. Particularly, the RANN 11a, 11b, 11c may be configured to, in an optional step S106a, instruct the WD 14a, 14b to report performed measurements on the mobility pilot signals of the at least one transmission beam to the RANN 11a, 11b, 11c. In this respect, in some cases, the instruction to measure may imply the obligation to request, i.e. these may not be two explicit separate instructions.

The RANN 11a, 11b, 11c may then update the location dependent performance quality criterion based on based on the measurements performed by the WD 14a, 14b. Particularly, the RANN 11a, 11b, 11c may be configured to, in an optional step S108a, receive measurement reports from the WD 14a, 14, and in response thereto, in an optional step S110a: dynamically update the location dependent performance quality criterion based on the received measurement reports.

There may be different ways for the signalling to be provided from the WD 14a, 14b. Different embodiments relating thereto will now be described in turn. For example, the WD 14a, 14b may be in active mode, and the signalling from the WD 14a, 14b may be user traffic signalling. For example, the location dependent performance quality criterion may be based on a signal quality indicator.

There may be different examples of signal quality indicators. For example, the signal quality may be indicative of channel quality, end-user experience, channel capacity, channel throughput, latency, and/or block error rate. For example, the signal quality indicator may correspond to a channel quality index, CQI. The CQI may correspond to a signal to interference plus noise ratio (SINR) value at the WD 14a, 14b, for example in dB, or the received signal power at the WD14a, 14b may be used instead. The CQI may be estimated from e.g. WD downlink measurements (e.g. demodulation reference symbols, DMRS, or Channel State Information Reference Signals, CSI-RS, in an LTE-like system) or by mapping data transmission in downlink to a SINR or CQI value using ACK/NACK feedback. Uplink measurements may also be considered if reciprocity is available. CQI measurements from different cells 12a, 12b, 12c may need to be adjusted for the downlink power for the cell. The RANN 11a may additionally or alternatively adjust the CQI report based on the current interference situation, i.e. if data is sent on adjacent beams. If several beams are transmitting to the WD 14a, the beam with largest CQI value may be considered, or a combination of CQI values from several (serving) transmission beams may be considered. The CQI values may be averaged over time or frequency to reduce estimation variance.

Thresholds may be determined in order for the RAN 11a, 11b, 11c to decide if uplink and/or downlink measurements should be performed. A first threshold (denoted $f_1$) may be used if a smaller cell 12C is located inside a larger cell 12a; see WD 14b in FIG. 1 A second threshold (denoted $f_2$) may be used for a cell handover scenario with WD 14a in FIG. 1 or for beam switching in the own cell. To determine a threshold, the RANN 11a may use the position of the WD 14a and previous measurements to create a look up table (LuT) that for every position of the WD 14a stores an estimated CQI value for triggering beam measurements. In this respect, the LuT may be updated after a handover considering the CQI value before and after handover, see below. The LuT might also need to compensate for WD specific settings, e.g. how many receiver antennas are used by the WD 14a. This may be achieved using an offset or by using separate tables. The RANN 11a may also benefit from predicting the next CQI value, $\widetilde{CQ}I_{n+1}^{(s)}$, using the previous CQI estimate for the serving transmission beam. Prediction of the CQI may allow the RANN 11a to faster start the beam measurement if the CQI is expected to drop, or avoid measurements if the CQI is expected to increase. For the prediction, a filter could be used with filter coefficients and length depending on a Doppler estimate, if available. If there are recent mobility measurements of other beams or cells, those measurements could be included in the threshold as well to avoid repeating the same measurements too quickly. In one embodiment, the threshold is determined as $$f(WD_{position},[CQI_n^{(s)} \ldots CQI_m^{(s)}],CQI_m^{(o)})=$$
$$LuT(WD_{position})+\theta \cdot (\widetilde{CQ}I_{n+1}^{(s)}-CQI_n^{(s)})+$$
$$\mu^{n-m} \cdot \omega \cdot (CQI_m^{(o)}-CQI_m^{(s)}),$$

where the index s indicates serving beam, the index o indicates another beam (such as a candidate target beam), the index n indicates the time, where $\theta$ and $\omega$ are a positive scaling factors, and where $\mu$ is used as a forgetting factor with value between 0 and 1 for mobility measurement of other cells or beams at time m, where m<n. The mobility measurements for the serving and the target beam at time m could use different metrics compared to the CQI updates for the serving beam at every time period, e.g. received power could be used when performing mobility measurements on the beams and SINR for the serving beam that is updated every time period.

The signal quality indicator may be a downlink signal quality indicator. Hence, the RANN 11a, 11b, 11c may be configured to, in an optional step S108b, receive a signal quality indicator from the WD 14a, 14b. The signal quality indicator pertains to signalling received by the WD 14a, 14b from the RANN 11a, 11b, 11c. The RANN 11a, 11b, 11c may then be configured to, in an optional step Snob, dynamically update the location dependent performance quality criterion based on the received signal quality indicator. The signalling received by the WD 14a, 14b from the RANN 11a, 11b, 11c may comprise data pilot signals. The signal quality indicator may be estimated for the data pilot signals.

The signal quality indicator may be an uplink signal quality indicator. Hence, the RANN 11a, 11b, 11c may be configured to, in an optional step S108c, estimate a signal quality indicator of the received signalling. The RANN 11a, 11b, 11c may then be configured to, in an optional step S110c, dynamically update the location dependent performance quality location criterion based on the estimated signal quality indicator. The signalling received by the RANN 11a, 11b, 11c from the WD 14a, 14b may comprise data pilot signals, and the signal quality indicator may be estimated for the data pilot signals.

For uplink measurements of neighboring cells, the serving cell may signal to the neighboring cells to measure on the WD 14a. If beam forming is used in the uplink, the serving cell may need to signal the uplink antenna weights as well.

The signalling received by the RANN 11a, 11b, 11c from the WD 14a, 14b may further be indicative of that a handover should be performed. Hence, the RANN 11a, 11b, 11c may be configured to, in an optional step S112, perform handover of the WD based on the signal quality indication.

There may be different ways to perform the uplink measurements (if available) and the downlink measurements For example, first uplink measurements (if available) may be performed and then downlink measurements may be performed. Thus, the step S108b of receiving the signal quality indicator from the WD 14a, 14b may be performed after the step S108c of estimating the signal quality indicator of the received signalling.

The uplink measurements may be used to decide if downlink measurements are necessary, for example if a target beam gives a larger CQI value than the serving beam plus an offset $\delta_{UL}$. The uplink measurements may be used to determine whether to directly perform a handover or not, by making a similar comparison with an offset $\tau_{UL}$. For example the relation $\tau_{UL} > \delta_{UL}$ may be used in order to avoid toggling between two transmission beams alternatingly acting as the serving beam.

The LuT, $\tau_{UL}$ and $\delta_{UL}$, for the serving cell before the handover may be updated to better reflect the latest measurements by considering the difference $\Delta CQI_{n+1}$ in CQI value. For example, the difference may be determined as:

$$\Delta CQI_{n+1} = CQI_{n+1}^{(s)} - CQI_n^{(s')},$$

where the index s' indicates the serving beam before the handover or the beam update. The LuT value for the position of the WD 14a may then be updated as follows:

$$LuT_{n+1}(WD_{position}) = LuT_n(WD_{position}) + \alpha(\Delta CQI_{n+1} + \sigma_{LuT}),$$

for some constants $\sigma_{LuT}$ and $\alpha$. The constant $\alpha$ may take different values depending on if $\Delta CQI_{n+1}$ is positive or negative, since it may be better to perform measurements too early than too late. For the uplink measurements, a parameter could also be included that reflects to how the uplink measurements correspond to downlink measurements, e.g. by considering the absolute difference in the measurements:

$$\tilde{\gamma}_{n+1} = \rho |CQI_{n+1}^{DL,(s)} - CQI_n^{DL,(s')} - (CQI_n^{UL,(s)} - CQI_n^{UL,(s')})|,$$

where $\rho$ is a positive constant. The uplink thresholds may then be updated as $$T_{UL,n+1} = (1-\beta)\tau_{UL,n} + \beta(\Delta CQI_{n+1} - \tilde{\gamma}_{n+1} + \sigma_\tau),$$

$$\delta_{UL,n+1} = (1-\beta)\delta_{UL,n} + \beta(\Delta CQI_{n+1} + \tilde{\gamma}_{n+1} + \sigma_\delta),$$

for some constants $\sigma_\tau$, $\sigma_\delta$ and $\beta$.

Reference is now made to FIG. 6 illustrating a method for triggering mobility measurements for a wireless device 14a, 14b as performed by the RANN 11a, 11b, 11c according to one particular non-limiting embodiment.

The particular embodiment discloses a method for activation of mobility pilot signals for evaluating downlink beam forming options for the purposes of beam switching and/or cell handover. Active mode is considered, meaning that the WD 14a is currently receiving data from the RANN 11a via a previously selected serving beam.

Step S202: the serving RANN 11a continuously receives measurements of the WD 14a in active mode. One way to implement step S202 is to perform any of steps S102, S102a, and S108b.

Step S204: Thresholds are determined and compared with the value $CQI_n^{(s)}$. One way to implement step S204 is to perform any of steps S104, S104a, S106, S106a, and S108a.

Step S206: If uplink-downlink reciprocity is possible to use, uplink measurements are used before downlink pilots are activated. One way to implement step S206 is to perform step S108c.

Step S208: The uplink measurements are used to determine whether to directly perform a handover or not, by making a similar comparison with an offset $\tau_{UL}$. One way to implement step S208 is to perform any of steps S108c, and S112.

Step S210: The uplink measurements are used to decide if downlink measurements are necessary, for example if a target beam gives a larger CQI value than the serving beam plus an offset $\delta_{UL}$. One way to implement step S210 is to perform step S108c.

Step S212: The downlink signaling and measurement procedure is activated. One way to implement step S212 is to perform any of steps S104, S104a, S106, S106a, S108a, and S112.

Step S214: After a handover (or new measurements of other cells or beams) the LuT, $\tau_{UL}$ and $\delta_{UL}$, for the serving cell before the handover is updated. One way to implement step S214 is to perform any of steps S110a, S110b, and S110c.

In summary, at least some of the herein disclosed embodiments relate to a procedure to activate beam finding measurements in a communications network 10 with beam forming of the downlink channel where there is no continuous transmission of pilot signals or beam reference signals. The transmission of downlink pilot signals for a certain transmission beam may activated based on a WD's 14a channel quality measurements and position of the WD 14a, and if possible also on uplink measurements.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for triggering mobility measurements for a wireless device, the method being performed by a radio access network node (RANN), the RANN being configurable to transmit using a set of transmission beams, the method comprising the steps of:
   receiving signalling from a wireless device (WD), wherein the signalling is indicative of a current position of the WD and a performance quality metric of the WD; and only in a case said performance quality metric fulfils a performance quality criterion:
   activating transmission of mobility pilot signals to the WD in at least one transmission beam in the set of transmission beams; and thereafter:
   instructing the WD to perform measurements on the at least one transmission beam.

2. The method according to claim 1, wherein said current position is provided as positional coordinates of the WD.

3. The method according to claim 1, further comprising:
   instructing the WD to report performed measurements on mobility pilot signals of the at least one transmission beam to the RANN.

4. The method according to claim 1, further comprising:
receiving measurement reports from the WD; and in response thereto:
dynamically updating the performance quality criterion based on the received measurement reports.

5. The method according to claim 1, further comprising:
receiving a signal quality indicator from the WD, the signal quality indicator pertaining to signalling received by the WD from the RANN; and
dynamically updating the performance quality criterion based on the received signal quality indicator.

6. The method according to claim 5, wherein said signalling received by the WD from the RANN comprises data pilot signals, and wherein said signal quality indicator is estimated for said data pilot signals.

7. The method according to claim 5, wherein said signal quality is indicative of at least one of a channel quality, end-user experience, channel capacity, channel throughput, latency, and block error rate.

8. The method according to claim 5 further comprising:
estimating a signal quality indicator of the received signalling; and
dynamically updating the performance quality criterion based on the estimated signal quality indicator,
wherein the step of receiving said signal quality indicator from the WD is performed after the step of estimating said signal quality indicator of the received signalling.

9. The method according to claim 1, further comprising:
estimating a signal quality indicator of the received signalling; and
dynamically updating the performance quality criterion based on the estimated signal quality indicator.

10. The method according to claim 9, wherein said signalling comprises data pilot signals, and wherein said signal quality indicator is estimated for said data pilot signals.

11. The method according to claim 9, further comprising:
performing handover of the WD based on said signal quality indication.

12. The method according to claim 1, wherein said WD is in active mode, and wherein said signalling from the WD is user traffic signalling.

13. The method according to claim 1, wherein said signalling is received on a serving transmission beam in said set of transmission beams, and wherein activating transmission of mobility pilot signals comprises:
activating transmission of mobility pilot signals to the WD in at least one target transmission beam in said set of transmission beams, wherein the at least one target transmission beam is different from the serving transmission beam.

14. The method according to claim 13, wherein said at least one target transmission beam is determined based on said current position of the WD.

15. The method according to claim 14, wherein said at least one target transmission beam further is determined based on information mapping WD positions to transmission beams in said set of transmission beams.

16. The method according to claim 14, wherein said at least one target transmission beam further is determined based on said performance quality metric of the WD.

17. The method according to claim 1, wherein said performance quality criterion depends on maximum available transmission power of the RANN towards the WD.

18. The method according to claim 1, wherein said performance quality criterion depends on whether said RANN is a macro RANN or a micro or pico RANN.

19. The method according to claim 1, wherein said performance quality criterion depends on number of antennas at the WD.

20. The method according to claim 1, further comprising:
receiving previous user traffic signalling indicative of at least one previous position of the WD and at least one previous performance quality metric of the WD; and
wherein said performance quality criterion depends on said at least one previous position of the WD and said at least one previous performance quality metric of the WD.

21. The method according to claim 1, wherein each transmission beam in said set of transmission beams corresponds to an individual cell, sector, wireless node, or access point.

22. A radio access network node (RANN) for triggering mobility measurements for a wireless device, the RANN being configurable to transmit using a set of transmission beams, the RANN comprising processing unit configured to:
receive signalling from a wireless device (WD), wherein the signalling is indicative of a current position of the WD and a performance quality metric of the WD; and
only in a case said performance quality metric fulfils a performance quality criterion:
activate transmission of mobility pilot signals to the WD in at least one transmission beam in the set of transmission beams; and thereafter:
instruct the WD to perform measurements on the at least one transmission beam.

23. A nontransitory computer readable storage medium comprising a computer program for triggering mobility measurements for a wireless device, the computer program comprising computer program code which, when run on a processing unit of a radio access network node (RANN) configurable to transmit using a set of transmission beams causes the processing unit to:
receive signalling from a wireless device (WD), wherein the signalling is indicative of a current position of the WD and a performance quality metric of the WD; and
only in a case said performance quality metric fulfils a performance quality criterion:
activate transmission of mobility pilot signals to the WD in at least one transmission beam in the set of transmission beams; and thereafter:
instruct the WD to perform measurements on the at least one transmission beam.

* * * * *